(No Model.)
A. C. RASCH.
LOOSE PULLEY.
No. 537,068. Patented Apr. 9, 1895.
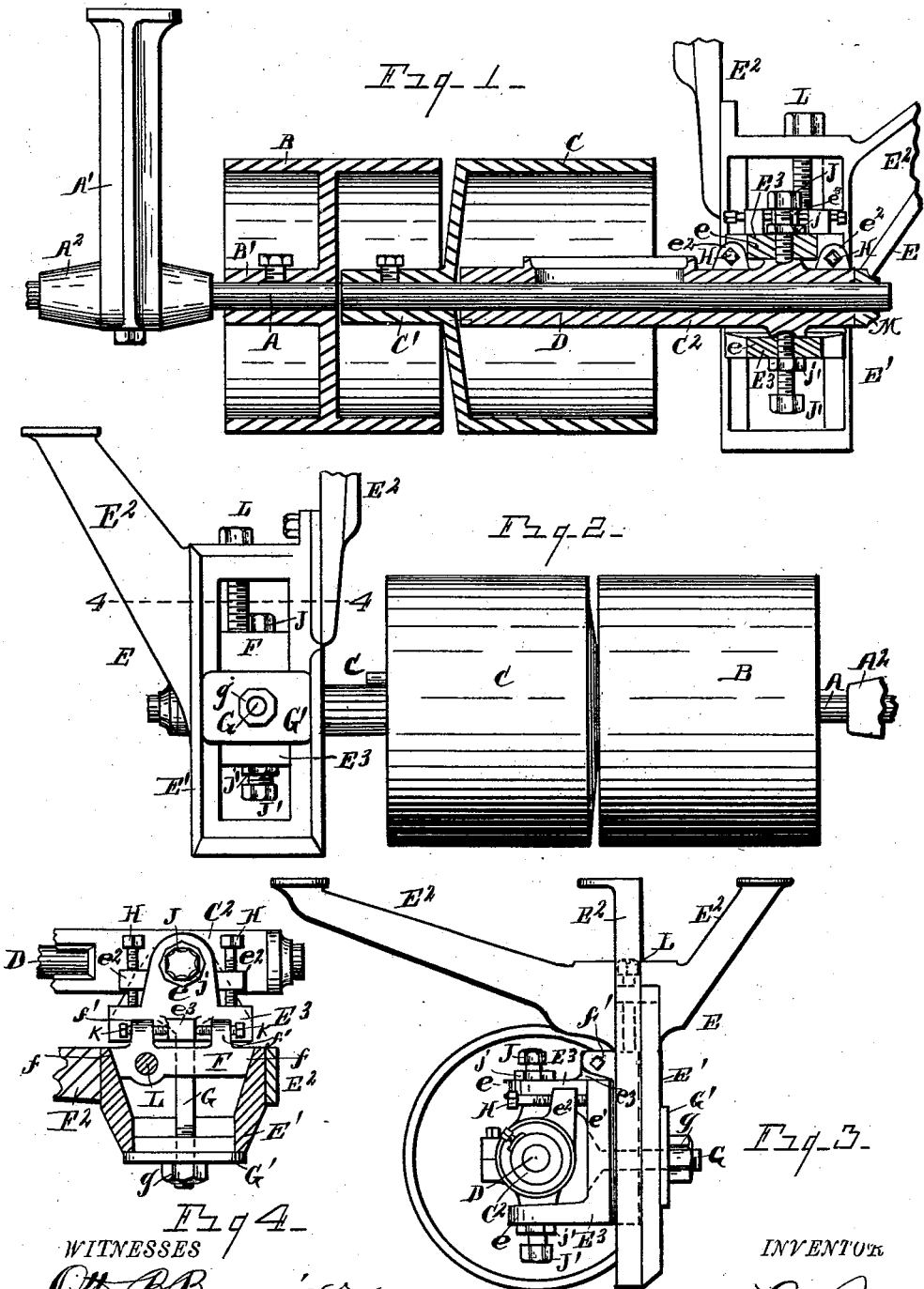
WITNESSES
Otto B. Baenziger.
M. A. Martin.
INVENTOR
Andrew C. Rasch
By his Attorney
Newell S. Wright.

UNITED STATES PATENT OFFICE.

ANDREW C. RASCH, OF NORTHVILLE, MICHIGAN, ASSIGNOR OF ONE-HALF TO EDWARD S. HORTON, OF SAME PLACE.

LOOSE PULLEY.

SPECIFICATION forming part of Letters Patent No. 537,068, dated April 9, 1895.

Application filed June 26, 1894. Serial No. 515,560. (No model.)

*To all whom it may concern:*

Be it known that I, ANDREW C. RASCH, a citizen of the United States, residing at Northville, county of Wayne, State of Michigan, have invented a certain new and useful Improvement in Loose Pulleys; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a loose or idle pulley having for its object a device of this character of superior utility, firmness and durability, and it consists of the construction, combination and arrangement of devices and appliances hereinafter specified and claimed, and illustrated in the accompanying drawings, in which—

Figure 1 is a vertical longitudinal section showing parts in elevation. Fig. 2 is a side elevation. Fig. 3 is an end elevation looking toward the adjustable hanger. Fig. 4 is a view in horizontal section on the line 4—4 Fig. 2.

Hitherto much difficulty has been experienced in the use of loose pulleys because of the rattling and wear, and it is one special object of my invention to overcome these difficulties, and to provide a device of this class in which the wear shall be reduced to a minimum and in which any wear may be remedied with very little difficulty and expense.

Another object of my invention is to provide such a pulley with an adjustable hanger whereby the pulley can be adjusted to the running of the belt in a very satisfactory manner.

My object is also to reduce friction to the least possible degree and to make a more satisfactory pulley of this character than those heretofore in use.

To these ends I carry out my invention as follows:

In the drawings, A represents a driving shaft provided with a fast pulley B.

A' is an ordinary hanger provided with a bearing $A^2$ in which the shaft A is journaled.

B' denotes the hub of the fast pulley B, said hub being constructed at one end or side of said pulley as shown, the opposite end or side of the pulley projecting laterally beyond said hub, as shown in Fig. 1. The shaft A terminates at or about the inner end of the hub B', said shaft projecting only partially through the fast pulley.

The loose or idle pulley mechanism embodied in my invention embraces a pulley C constructed with a hub C' projected within the adjacent end or side of the pulley B, as shown in Fig. 1, the pulley C being mounted upon an independent shaft D, said shaft projected within the hub C' and therefore extending with said hub within the adjacent portion of the fast pulley B. By projecting the hub C' within the adjacent portion of the pulley B, the two pulleys B, C, may be located closely together as required.

$C^2$ is a boxing or bearing within which the shaft D is extended, said bearing projecting within the pulley C, as shown, nearly or about the entire width of the pulley C. The shaft D and bearing $C^2$ are also extended in the opposite direction, said bearing being engaged on the end opposite the hub C' by an adjustable hanger E.

Any suitable hanger may be employed within the scope of my invention, to engage the bearing $C^2$, but I prefer an adjustable hanger, as shown herewith, although I do not limit myself thereto.

The adjustable hanger illustrated in the drawings, consists of a frame-work E' provided with hanger arms $E^2$.

$E^3$ denotes a yoke formed with arms "e" and a connecting shank e'.

F denotes a sliding plate having a movable engagement in the frame-work E'. I prefer that the adjacent faces of the sliding plate F and frame-work E' should be beveled, as shown at "f," Fig. 4. The sliding plate F is formed with ears f'. A bolt G passed through the shank e' of the yoke and through the plate F, securely holds the yoke and sliding plate in position in the frame E'.

G' is a washer upon the end of the bolt, and "g" is a nut over the washer.

It will be evident that by loosening the nut "g," the yoke $E^3$ and plate F may be vertically adjusted to any desired position in the frame E'.

The boxing or bearing $C^2$ is formed with ears $e^2$ through which adjusting bolts H are passed, the inner ends of said bolts bearing against the adjacent portion of the yoke $E^3$ whereby the position of the boxing and the shaft D may be adjusted toward or away from the frame-work E'.

J and J' are bolts passed through the arms "$e$" of the yoke, the inner ends of said bolts engaging the boxing $C^2$, as shown more particularly in Fig. 1, and by which said boxing is supported in the hanger E. Lock-nuts "$j$" and $j'$ upon said bolts, effectually hold them in given position to support said boxing. The yoke $E^3$ is constructed with a lug $e^3$, and the sliding plate F with the ears "$f$," $f'$, through which pass adjusting bolts K, their inner ends engaging against the lug $e^3$. L is an adjusting bolt engaging at its lower end the sliding plate F, and by means of which the yoke $E^3$ may be vertically adjusted in the hanger frame E'. By means of these various adjusting bolts and related devices, it will be evident that the boxing and consequently the shaft D may be readily adjusted into any desired position. Should the hub or boxing of the loose pulley wear at any time, the difficulty can readily be remedied by the application of Babbitt-metal. At the same time it will be apparent that friction is reduced to a minimum, inasmuch as the pulley C is mounted on an independent shaft and rotates therewith, its shaft running in an independent boxing.

I have termed the device an improvement in a loose pulley, that being the ordinary nomenclature for a pulley designed for this purpose, although, as a matter of fact, as will be seen, the pulley C is not loose upon its shaft; but at the same time, the pulley and its shaft are loose from the fast pulley B and its shaft A.

M is a collar upon the end of the shaft D.

Projecting the boxing into the loose pulley and substantially the whole length thereof, is for the purpose of bringing the bearing directly under the center of the pressure of the belt, thereby making the loose pulley as noiseless as a fast pulley.

It will be observed that the boxing for the shaft D is supported at one side of the hanger, and that the hanger is able to support a shaft in said boxing without the aid of an additional hanger.

What I claim as my invention is—

1. In combination, a fast pulley B and its shaft, an idle pulley C constructed with a laterally projecting hub extended within the adjacent side of the fast pulley, an independent shaft D on which the idle pulley is mounted, a bearing for the shaft D projected within the idle pulley, and a hanger supporting said bearing and provided with a frame work and with hanger arms, a slidable plate F vertically adjustable in said frame work, a yoke having an adjustable engagement with said slidable plate, said bearing having an adjustable engagement with said yoke, substantially as set forth.

2. In combination, a shaft and its bearing, a hanger therefor provided with a frame work and with hanger arms, a slidable plate F vertically adjustable in said frame work, a yoke having an adjustable engagement with said slidable plate, said bearing having an adjustable engagement with said yoke, substantially as set forth.

In testimony whereof I sign this specification in the presence of two witnesses.

ANDREW C. RASCH.

Witnesses:
C. R. HORTON,
F. M. HORTON.